United States Patent [19]

Reuter

[11] Patent Number: 4,711,279

[45] Date of Patent: Dec. 8, 1987

[54] DEVICE FOR SHAVING THE SIDES OF TREE TRUNKS

[75] Inventor: Alfred Reuter, Oberkirch, Fed. Rep. of Germany

[73] Assignee: Gebruder Linck Maschinenfabrik und Eisengiesserei "Gatterlinck", Oberkirch, Fed. Rep. of Germany

[21] Appl. No.: 822,304

[22] PCT Filed: Apr. 25, 1985

[86] PCT No.: PCT/EP85/00185

§ 371 Date: Dec. 30, 1985

§ 102(e) Date: Dec. 30, 1985

[87] PCT Pub. No.: WO85/05063

PCT Pub. Date: Nov. 21, 1985

[30] Foreign Application Priority Data

Apr. 28, 1984 [DE] Fed. Rep. of Germany ....... 3415932

[51] Int. Cl.⁴ .............................................. B27C 9/04
[52] U.S. Cl. ...................................... 144/39; 144/41; 144/370; 144/378; 198/407; 198/458
[58] Field of Search ............... 198/407, 422, 458; 144/39, 378, 370, 376, 37, 41

[56] References Cited

U.S. PATENT DOCUMENTS

| | | |
|---|---|---|
| 3,457,978 | 7/1969 | Ahlstedt ............................ 144/370 |
| 3,487,866 | 1/1970 | Mitten .................................. 144/41 |
| 3,934,630 | 1/1976 | Cockle ................................. 144/39 |
| 4,239,069 | 12/1980 | Zimmerman ......................... 144/41 |
| 4,300,604 | 11/1981 | Zimmerman ......................... 144/39 |
| 4,327,789 | 5/1982 | Reuter ................................. 144/39 |
| 4,561,477 | 12/1985 | Zimmerman ......................... 144/41 |

FOREIGN PATENT DOCUMENTS

| | | |
|---|---|---|
| 1905744 | 9/1969 | Fed. Rep. of Germany . |
| 2947190 | 5/1981 | Fed. Rep. of Germany . |
| 2928949 | 10/1981 | Fed. Rep. of Germany . |
| 3222824 | 2/1983 | Fed. Rep. of Germany . |
| 3209747 | 2/1986 | Fed. Rep. of Germany . |

Primary Examiner—W. D. Bray
Attorney, Agent, or Firm—Burns, Doane, Swecker & Mathis

[57] ABSTRACT

Two circular saws are arranged with their rotary axes parallel to each other and driven in opposite rotational directions. The flight circles of the two saws overlap each other. The cutting edges each extend, without touching, into the gaps of the respective other saw. The saws are driven in forced synchronism.

5 Claims, 14 Drawing Figures

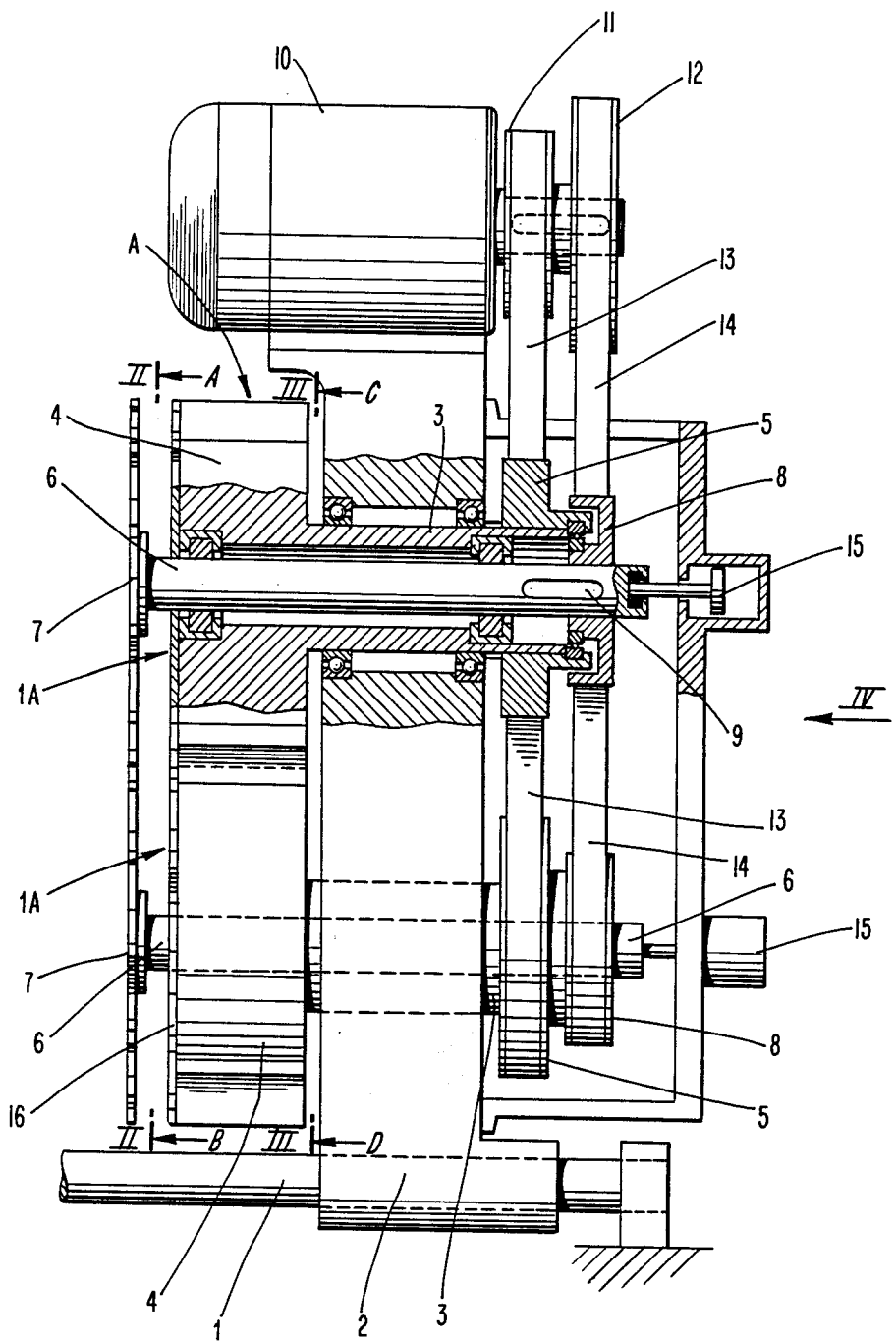

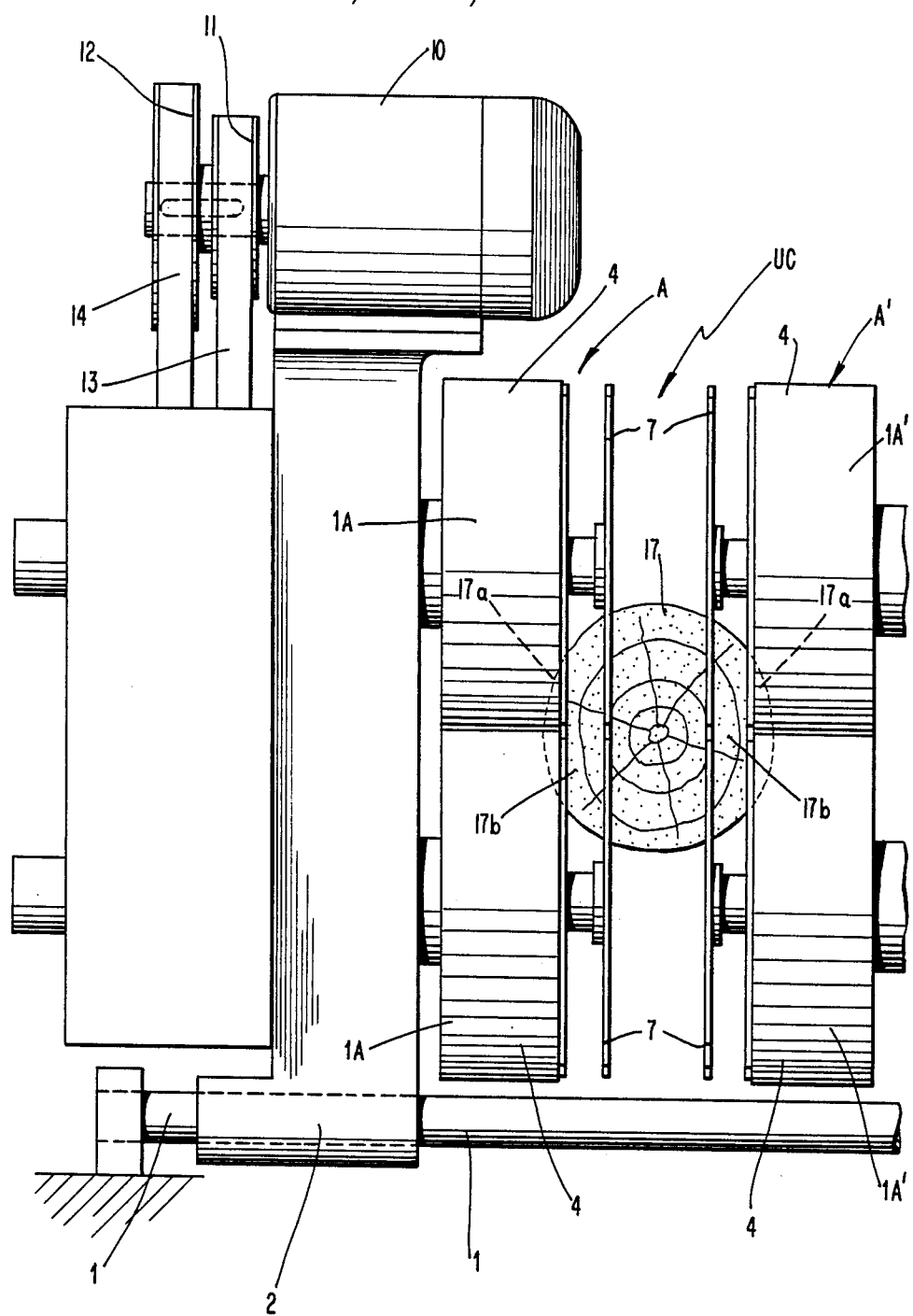

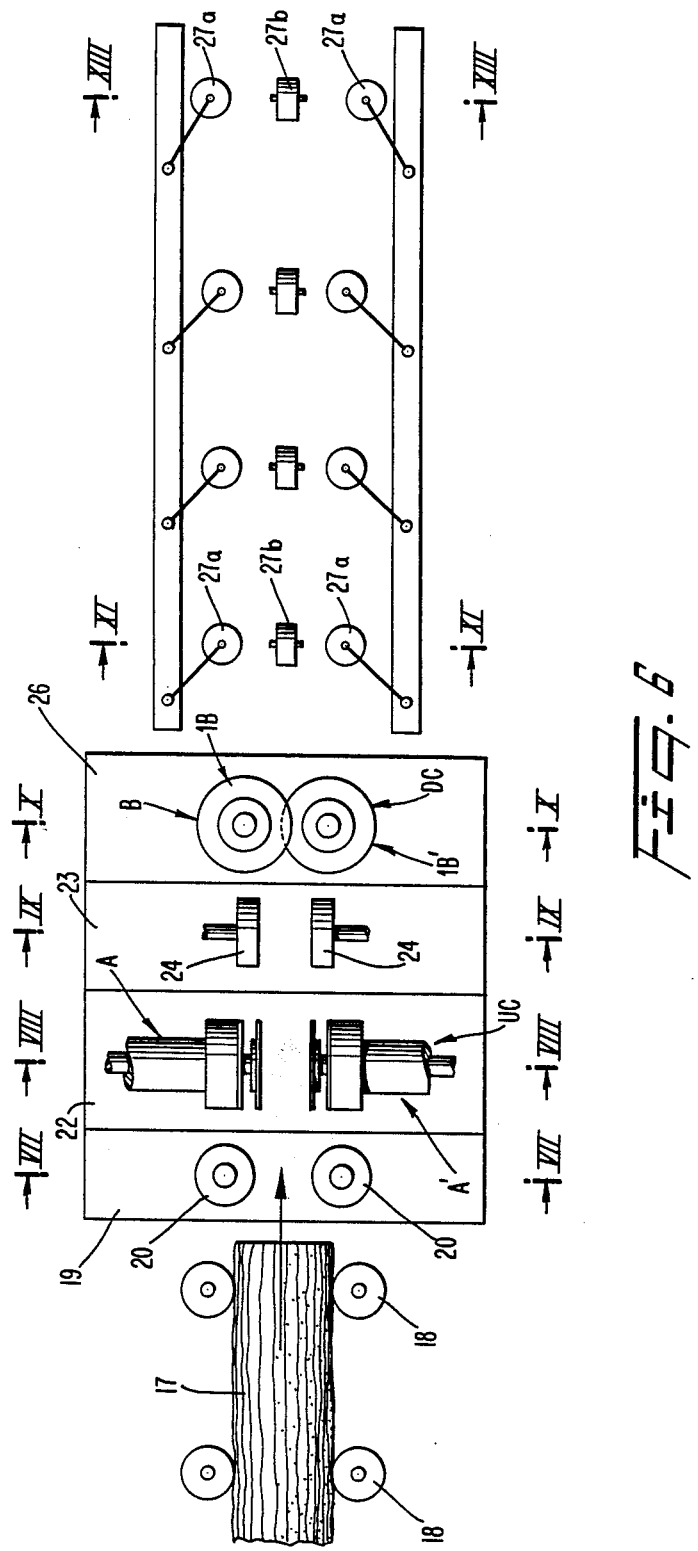

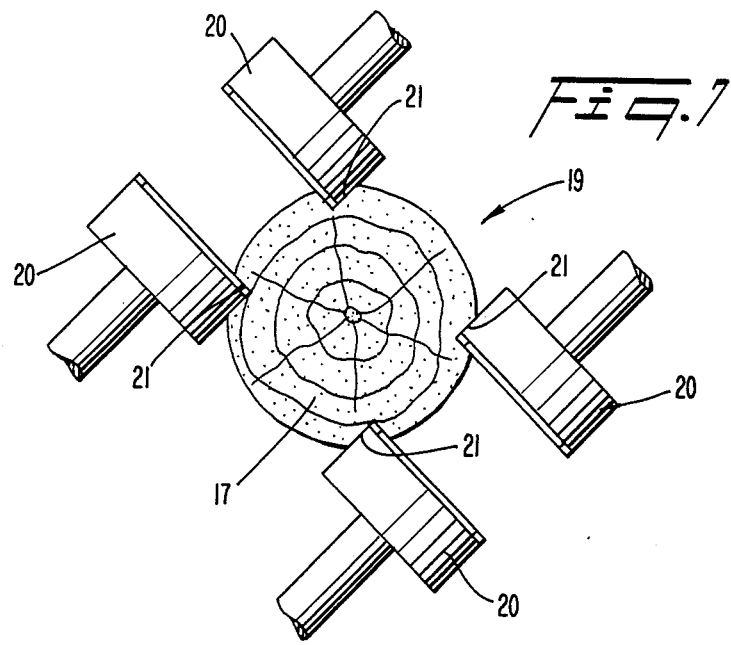
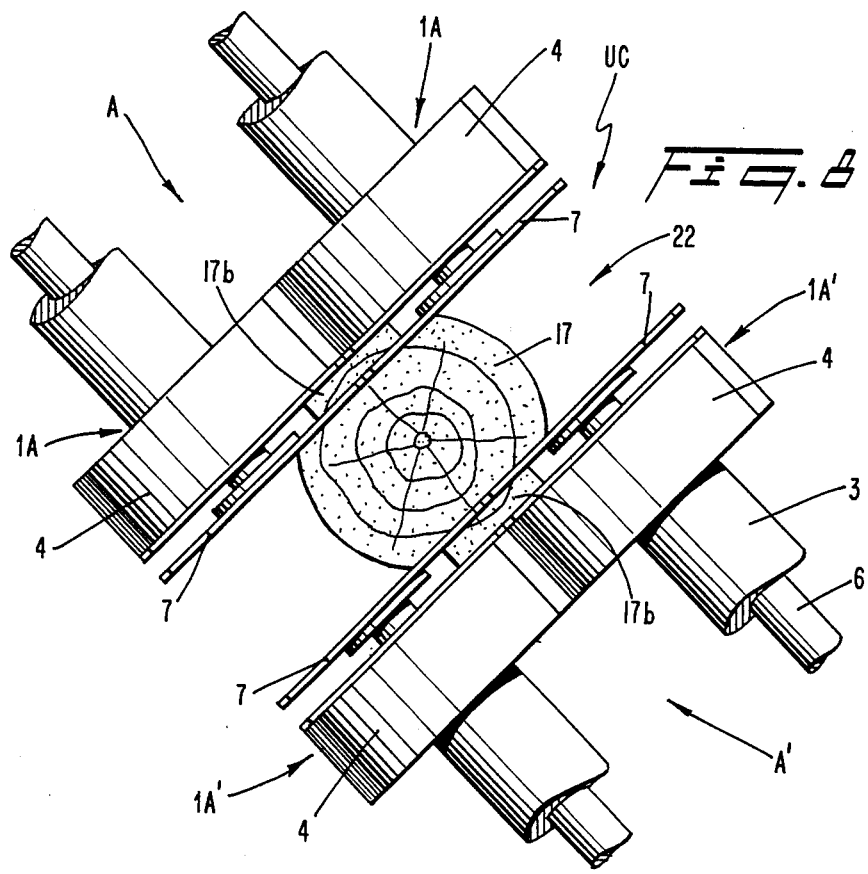

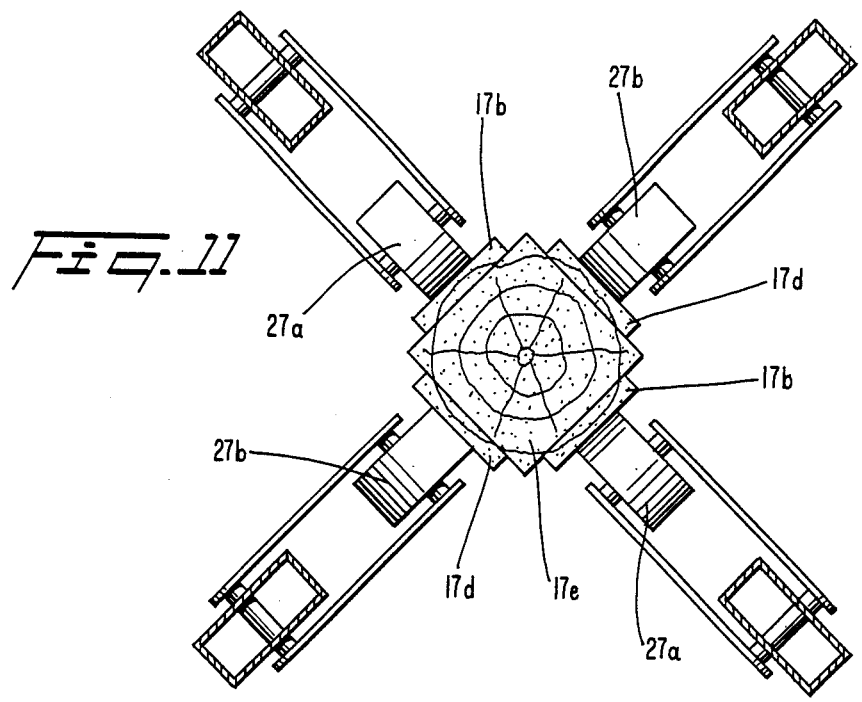
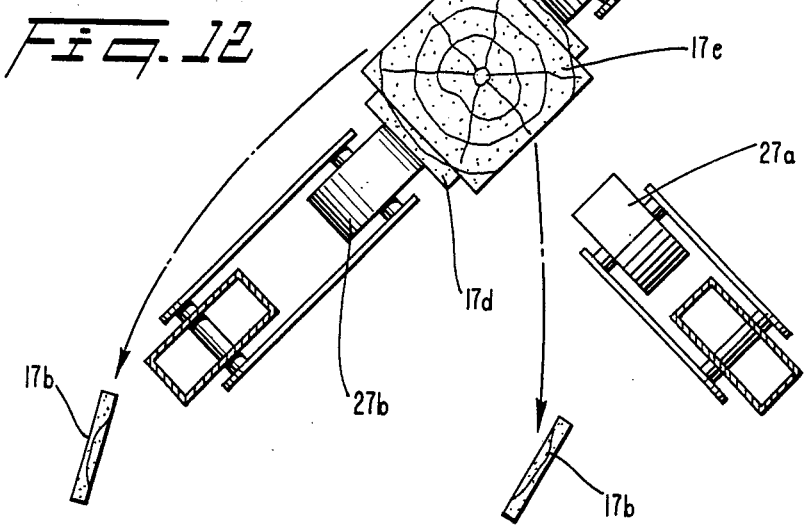

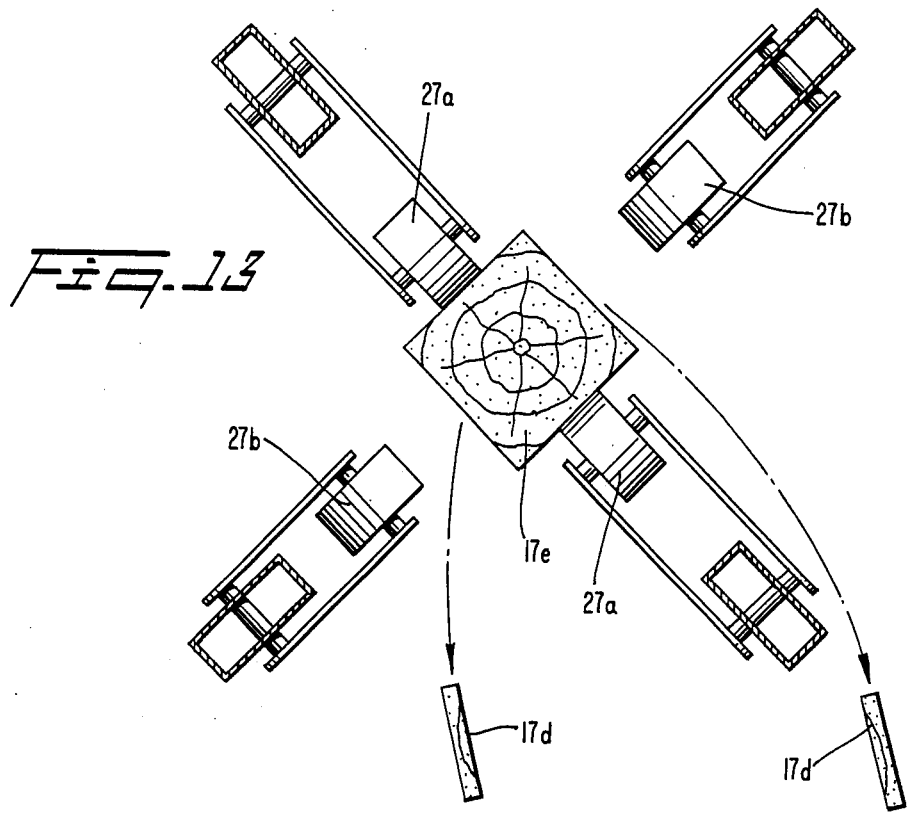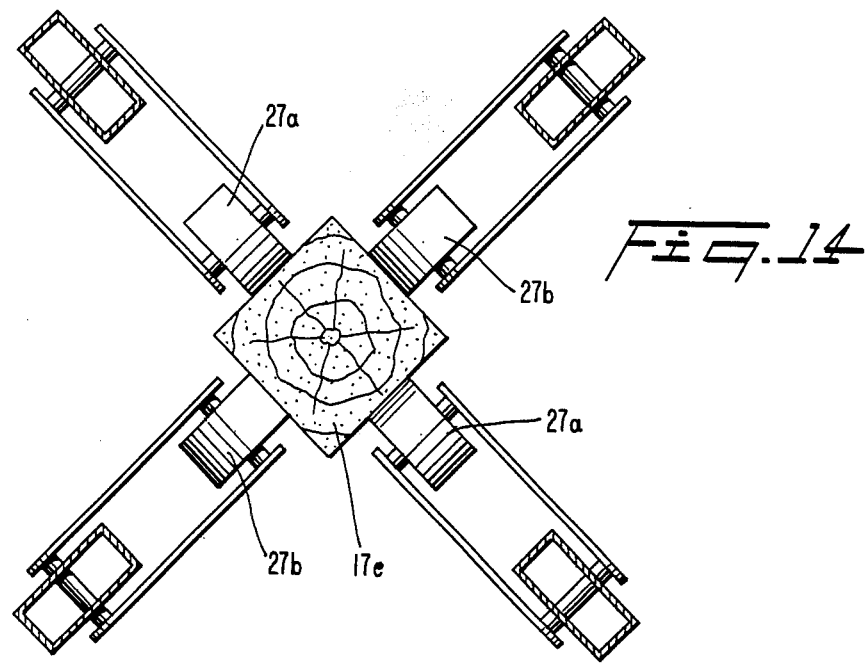

4,711,279

DEVICE FOR SHAVING THE SIDES OF TREE TRUNKS

BACKGROUND OF THE INVENTION

The invention relates to an apparatus for the chip-removing processing of logs for the production of sideboards and/or wood chips with tools executed as circular saws and/or knife heads which have cutting edges distributed on the circumference, whereby two tools each are arranged with rotation axes that are parallel to each other and are driven in opposite rotation senses.

For the production of wood chips from side parts of logs transported in longitudinal direction, which can be round timber logs or already two-sidedly flattened modules, knife heads are used with rotation axes disposed transversely to the longitudinal direction of the wood. The sawing off of the sideboards is carried out in a known apparatus (DE-PS No. 29 28 949) with double circular saws, both circular sawblades of which are arranged with rotation axes parallel to each other and at the same time displaced in the longitudinal direction of the wood with respect to each other so that the cutting lines produced by the two circular saws overlap when viewed in the longitudinal direction of the wood without the circular saws touching one another. It is also known how to arrange the circular saws used to saw off the sideboards directly on the shaft of the knife heads and in axial distance to these (DE-OS No. 29 47 190). In this case the whole depth of cut has to be cut by only one circular sawblade which must have a correspondingly large diameter.

When only one knife head is used on each side of the log to produce the wood chips, strong unilateral forces are applied to the log, especially at the log beginning during engagement of the knife heads which make necessary an expensive guiding of the log. The diameter of the knife heads has to be chosen in such a way that the front side of the knife heads is in any case larger than the largest created width of the lateral surface of the log.

Even when so-called double circular saws are used, the force application is unilateral, when the log comes in, because one of the two circular saws by necessity engages the log earlier than the other circular saw. Because the circular saws that engages the log first cuts on a part of the wood in fiber-longitudinal direction, relatively long, stringlike fibers are created which cannot be screened out and which therefore cause considerable difficulties during the separation of the wood chips from the sawdust.

It is therefore the object of the invention to design an apparatus of the initially described type in such a way that as small as possible unilateral forces occur during the processing of the sides of the logs and that no long fibers are produced during the sawing process.

This object is attained according to the invention, in that the flight circles of the two tools overlap each other, the cutting edges of each tool engage into the gaps between the cutting edges of the respective other tool without touching, and both tools are driven in a forced synchronous run.

The two tools working in pairs (knife heads or circular saws) intermesh with their cutting edges in the work area. Therefore the two tools can be arranged at the same height and come into engagement simultaneously at least in the case of the regularly shaped logs. The forces occurring on both tools which are not directed in the longitudinal direction of the wood compensate each other. The overlap of the two tools occurs in the circumferential zone in which the cutting edges cut approximately in the longitudinal direction of the wood. If the two tools are circular saws, the formation of long fibers is prevented at this location, because the cutting edges of the two adjacent circular saws come into engagement alternatingly. Therefore, sawdust is also created in this region which can be sifted away without difficulty.

The invention is explained in more detail with respect to the embodiments shown in the drawings.

FIG. 1 shows an apparatus provided with knife heads and circular saws for the processing of the sides of logs to produce sideboards and wood chips.

Figure 9:
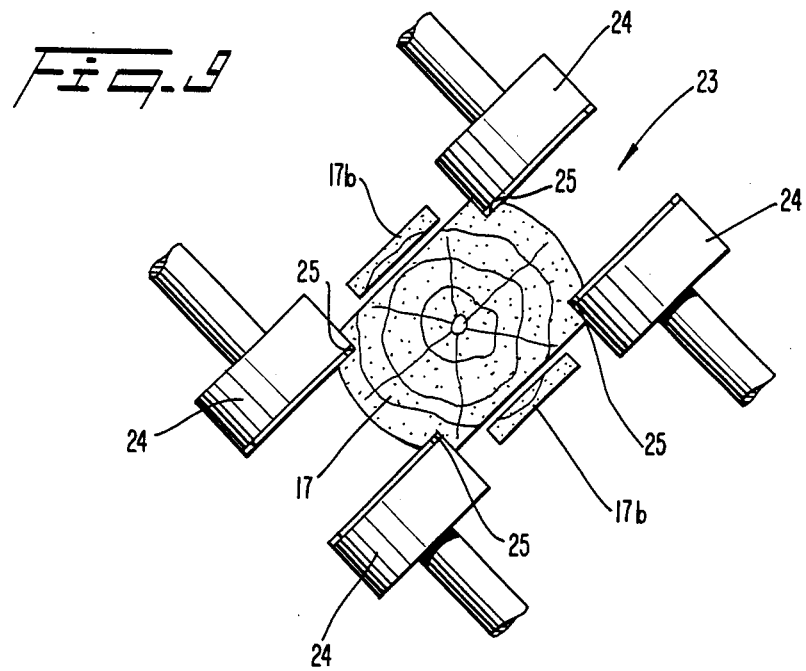
Figure 10:
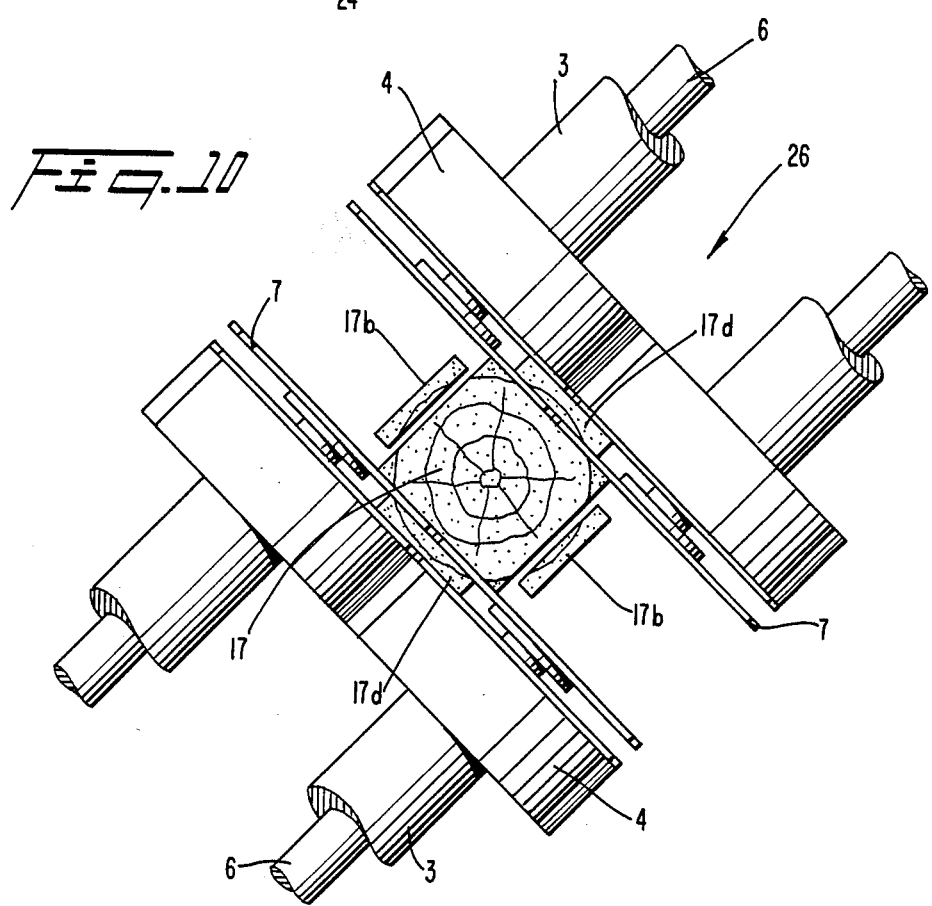

FIG. 5 shows the processing of a round timber log with two apparatus which are shown in FIG. 1, FIG. 6 is a lateral view of an installation to finish logs in which apparatus according to FIGS. 1 to 5 are inserted, FIG. 7 is a magnified cross-section indicated by the Line VII—VII in FIG. 6, FIG. 8 is a magnified cross-section indicated by the Line VIII—VIII in FIG. 6, FIG. 9 is a magnified cross-section indicated by the Line IX—IX in FIG. 6, FIG. 10 is a magnified cross-seciton indicated by the Line X—X in FIG. 6, FIGS. 11 and 12 are magnified cross-sections indicated by the Line XI—XI in FIG. 6, and FIGS. 13 and 14 are magnified cross-sections indicated by the Line XIII—XIII in FIG. 6, in different respective work positions.

DESCRIPTION OF PREFERRED EMBODIMENTS OF THE INVENTION

Depicted schematically in FIG. 6 is a log cutting facility to which a log 17 is fed by feed rollers 18. As will be explained subsequently in greater detail, four edges of the log are trimmed at a milling station 19 by four trimmers 20 (see also FIG. 7). Then, two opposite sides of the log are cut at a working station 22 by an upstream log cutter UC which comprises a pair of side cutters A and A' (see also FIG. 8). Each of the side cutters comprises two tools 1A, 1A and 1A', 1A' having intermeshing edges. Then, four additional edges of the log are trimmed at a trimming station 23 by four trimmers 24 (see also FIG. 9). Thereafter, the log is fed to a working station 26 at which the remaining two opposite sides of the log are cut by a downstream log cutter DC which comprises a pair of side cutters B and B' (see also FIG. 10). Each of the side cutters B and B' comprises two tools 1B, 1B and 1B', 1B' having intermeshing edges. Thereafter, the log is engaged by sets of guide rollers 27a, 27b which are alternately raised out of contact from the log to allow the cut-off sideboards to fall from the log. Depicted in FIG. 1 is one of the upstream side cutters A. That cutter includes a sled 2 which is displaceable on guides 1, in which two hollow shafts 3 are rotatable about parallel axes and spaced on top of each other, which each carry a knife head 4 at their front end and a toothed belt pulley 5 at their rear end. In each hollow shaft 3, a rotatable saw shaft 6 is axially displaceably supported, which carries a circular saw 7 at its front end. At the rear end of each hollow shaft 3, a toothed belt pulley 8 is rotatably mounted and is connected with the saw shaft 6 by a key 9 to be rotatable therewith.

On the sled 2, a common drive motor 10 is arranged which carries two toothed belt pulleys 11 and 12 which drive the belt pulleys 5 and 8, respectively, and with it the hollow shafts 3 and the saw shaft 6, respectively by means of a toothed belt 13 or 14, respectively. By means of fluid cylinders 15, the saw shaft 6 and with it the circular saws 7 can be axially adjusted.

Figure 3:
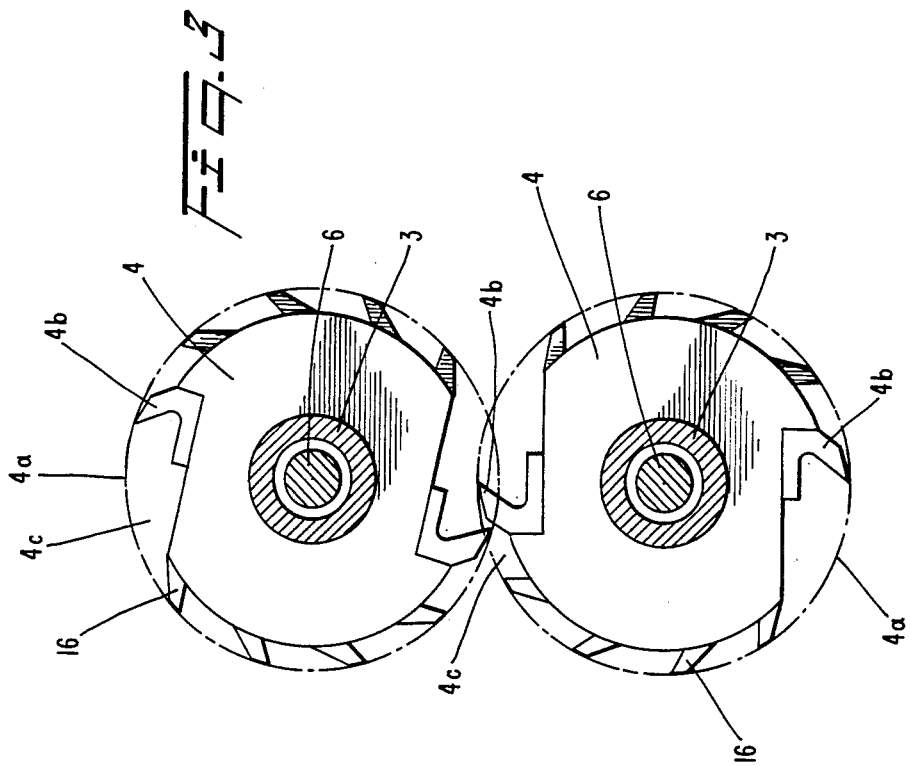
FIG. 3 shows a cross-section indicated by Line III—III in FIG. 1.
Figure 2:
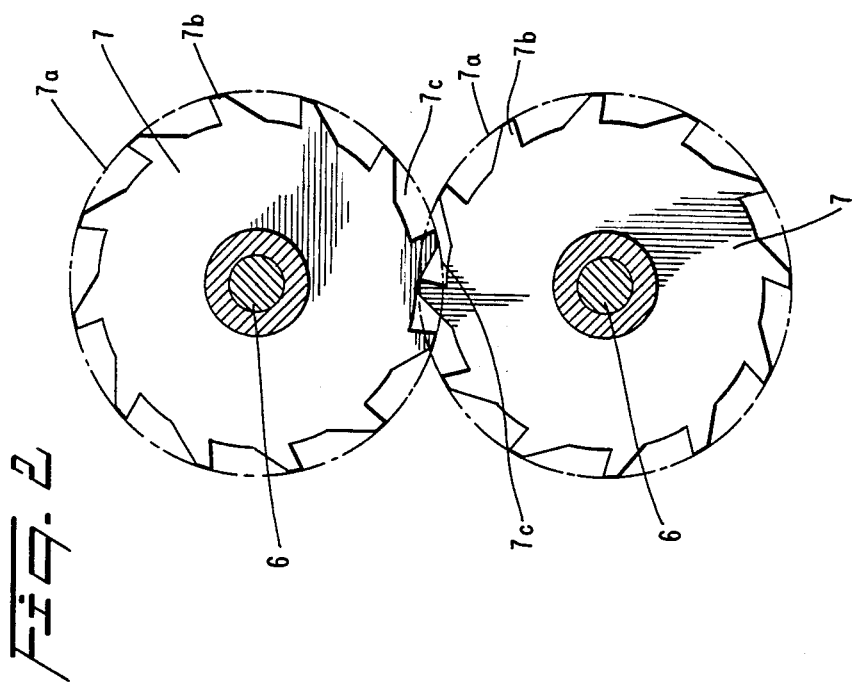
FIG. 2 shows a cross-section indicated by Line II—II in FIG. 1.

As can be seen in FIGS. 2 and 3, the flight circles 7a of the circular saws 7 overlap partially. The cutting edges of the circular saws 7 which are constituted by the saw teeth 7b engage into the teeth gaps 7c of the respective other circular saw 7 without touching the latter.

Correspondingly, the flight circles 4a of the two knife heads 4 also overlap. The cutting edges of the knife heads 4 which are shaped as chopping knives 4b engage into the gaps formed in front or behind the chopping knives 4b of the respective other knife head 4 without touching the latter. In the embodiment shown, another circular sawblade 16 is attached on the front side to each knife head 4. The flight circles of the two circular sawblades 16 also overlap each other in the manner described above.

Figure 4:
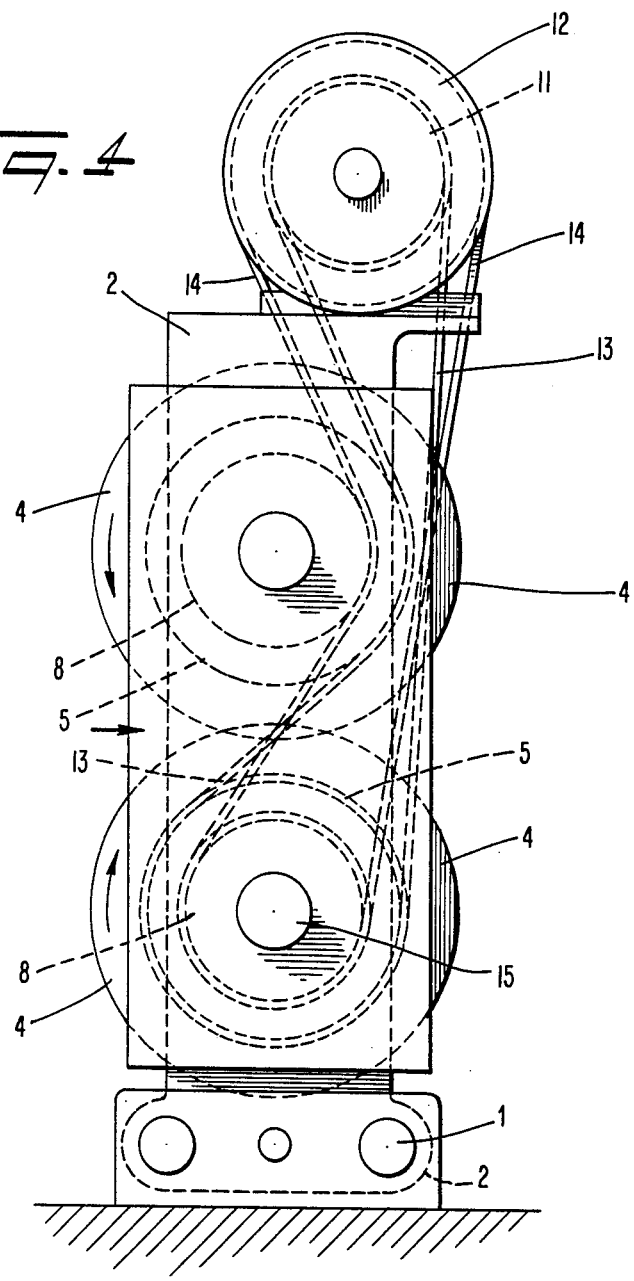
FIG. 4 is a view seen in the direction of the arrow IV in FIG. 1.

As can be seen in FIG. 4, the toothed belts 13 and 14 loop around the driven belt pulleys 5 and 8, respectively, in opposite directions. The toothed belts 13 and 14 are equipped with teeth on both sides. In this manner, the two knife heads 4 are driven in opposite directions. In the same way, the two circular saws 7 are driven in a forced synchronous run in opposite directions. The diameter ratios of the toothed belts 5,8,11 and 12 are chosen in such a way that the circular saws are driven at higher rotational speeds than the knife heads. The toothed belt drives each constitute a form-locking, non-slipping unit by which the drive of the knife heads 4 and the circular saws 7, respectively, is ensured in such a way that the intermeshing cutting edges do not touch each other but their flight circles and work areas overlap.

FIG. 5 shows the processing of a round timber log 17 with two apparatus as shown in FIG. 1 to 4. For simplicity of representation, the apparatus on the right-hand side in FIG. 5 is only partially shown. With the knife heads 4, the outermost lateral sections 17a of the round timber log 17 are processed into wood chips, while the circular saws 7 saw off the sideboards 17b from the round timber log 17, from which a two-sidedly flattened module is formed in this way, the two unprocessed sides of which can be subsequently processed again in the same way. FIG. 6 shows an installation for the processing of round timber logs 17 which are supplied by feed rollers 18. The individual following work stations are shown simplified in FIG. 6 in a lateral view, whereby the rotary axes of the knife heads and circular saws used are arranged horizontally and perpendicularly. In deviation from this arrangement, the cross-sections in FIG. 7 to 14 show that according to a preferred embodiment of the invention, these rotary axes can also be arranged at 45 degree angles relative to vertical. This arrangement is referred to in the following joint description of FIG. 6 on the one hand and FIG. 7 to 14 on the other hand.

The still unprocessed round timber log 17 arrives initially at the milling station 19 (FIG. 7) where four edges 21 are trimmed out by four side trimmers 20. At these edges 21, the log 17 is then guided by guides (not shown). The log 17 then directly reaches the working station 22 (FIG. 8) in which an apparatus according to FIG. 5 is arranged. Its knife heads 4 cut the opposite-lying outer sections of the log 17 to wood chips, while the circular saws 7 separate a sideboard 17 each in the manner already described, the borders of which have already been trimmed and have trimmed edges 21.

As can be seen in FIG. 9, the sideboards 17b maintain their position, with respect to the log 17, in the subsequent trimming station 23, while additional edges 25 are trimmed off by the four edge trimmers 24. The log 17 can be guided onwards at these trimmed-off edges, before it enters an additional working station 26 (FIG. 10) which is built corresponding to the work station 22, but the axes of the knife heads 4 and the circular saws 7 are oriented at ninety degree angles with respect to those at station 22. Here, the opposite sides of the log 17 which had not yet been processed, are worked on in the same way as at station 22, i.e. wood chips and sideboards 17d are produced.

When the log 17 leaves the last working station 26, it has become a beam or square timber 17e with the sawed-off sideboards 17b and 17d lying at its four sides, pressed against the beam 17e by movable transportation or guide rollers 27a, 27.

As soon as the beam 17e and the sideboards 17b and 17d are completely outside of the last working station 26 and located between the guide rollers 27a, 27 as shown in FIG. 6, the guide rollers 27a are lifted off on two opposite sides, as shown in FIG. 12 by an actuation apparatus (not shown), so that the two sideboards 17b can drop off and be transported away. The guide rollers 27b which abut against the two other opposite-lying sideboards 17b hold the beam 17e and guide it. When the sideboards 17b have dropped off, the guide rollers 27a are pressed against the beam 17e again, and the other guide rollers 27b are lifted off, so that now the two sideboards 17d can drop off (FIG. 13). The guide rollers 27a are subsequently also pressed against the beam 17e which is then guided on all four sides and transported on (FIG. 14).

The oblique arrangement of the working and guiding apparatus shown in FIGS. 7 to 14 which causes the sides of the beam 17e to also have 45 degree angles with respect to the perpendicular position, lets the sideboards 17b and 17d dropp off quickly and reliably, as soon as the respective guide rollers 27a and 27b, respectively, are pulled off.

The drive apparatus of the knife heads 4 is chosen in such a way that these work in synchronism with the feed movements of the log 17 as indicated in FIG. 4 by arrows. In this way, high-quality wood chips are produced. Correspondingly, the circular saws 7 also work in synchronism with the feed movement of the log 17.

If the processing of the log 17 is only carried out by circular saws 7, 16, if the outer parts 17a are not processed into wood chips, but to boardings, the circular saws 7 and 16, respectively, can be either driven in synchronism with the feed movement of the log 17 or contrarotatingly.

In FIGS. 6, 7 and 9, it was shown that the edges 21 and 25 are trimmed after each other. It is also possible to trim these edges 21 and 25 simultaneously.

Deviating from the embodiment shown, several sideboards can also be sawed off one each side of the log 17, for example an additional circular saw can be arranged which is spaced apart from the circular saw 7 on the saw shaft 6.

I claim:

1. Apparatus for cutting wood logs for the production of sideboards and chips comprising:
   means for displacing wood logs,
   an upstream log cutter including a pair of upstream side cutters for cutting opposite first sides of a log as the log is displaced, and
   a downstream log cutter arranged downstream of said upstream log cutter and including a pair of downstream side cutters for cutting opposite second sides of the log.
   each of said upstream and downstream side cutters comprising two cooperating rotary tools rotatable about parallel axes, said axes oriented at acute angles relative to vertical, each of said tools including:
   a knife head carrying a plurality of circumferentially spaced cutting edges,
   a first circular saw blade mounted coaxially at an end of said knife head and including a plurality of circumferentially spaced cutting edges, and
   a second circular saw blade spaced coaxially from said first saw blade and including a plurality of circumferentially spaced cutting edges,
   said two knife heads of each said side cutter having their cutting edges circumferentially offset and in intermeshing relationship, said two first saw blades of each side cutter having their cutting edges circumferentially offset and in intermeshing relationship, said two second saw blades of each side cutter having their cutting edges circumferentially offset and in intermeshing relationship.

2. Apparatus according to claim 1, wherein each of said acute angles is 45 degrees.

3. Apparatus according to claim 1 including a first drive motor rotatably connected to all four tools of said upstream log cutter by means of positive non-slip gearing, and a second drive motor rotatably connected to all four tools of said downstream log cutter by means of positive non-skip gearing.

4. Apparatus according to claim 2, wherein each said gearing comprises toothed gears coaxially arranged on said tools, and a pair of belts carrying teeth on each side and connected to said toothed gears such that said knife head, first saw blade, and second saw blade of each tool rotate in an opposite direction with respect to said knife head, said first saw blade, and second saw blade of a cooperating said tool.

5. Apparatus according to claim 1, wherein said first and second saw blades of each said tool are arranged to cut a sideboard from the log, and further including a first set of guide rolls arranged to engage and support said first sides of the log, and a second set of guide rolls arranged to engage and support said second sides of the log, said first and second sets of guide rolls disposed downstream of said downstream log cutter, said first and second sets of guide rolls being alternately retractable from the log.

* * * * *